Patented June 4, 1929.

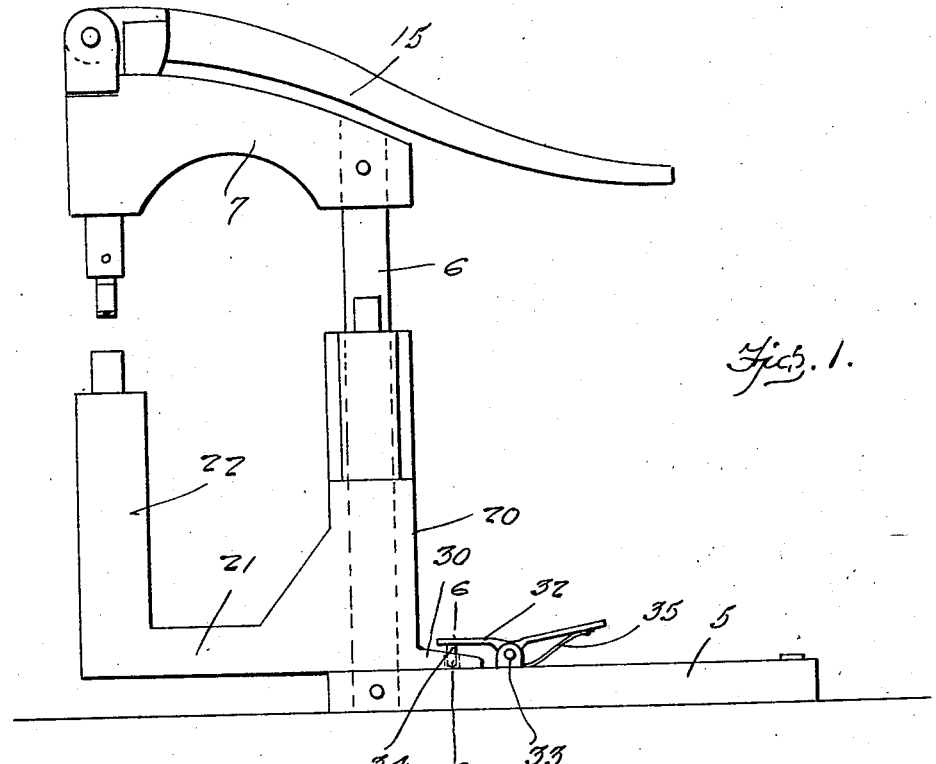
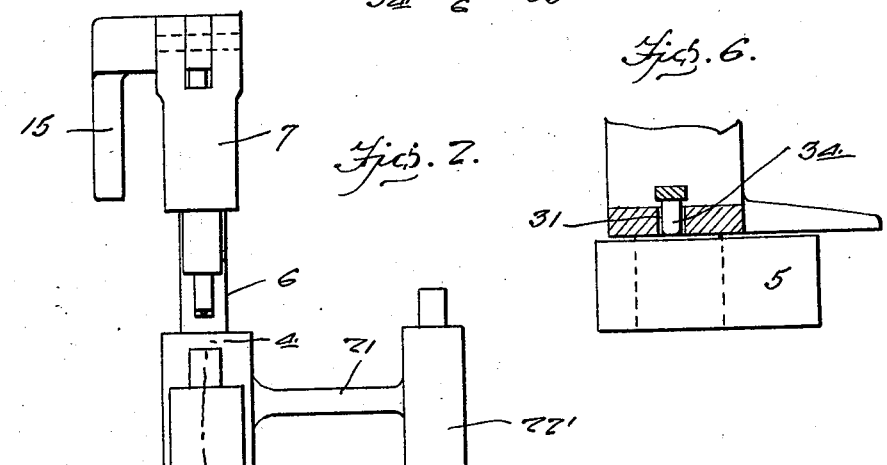

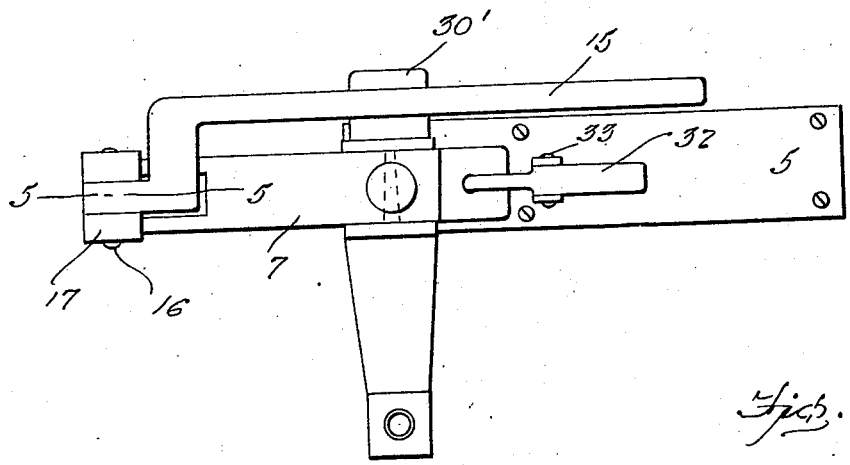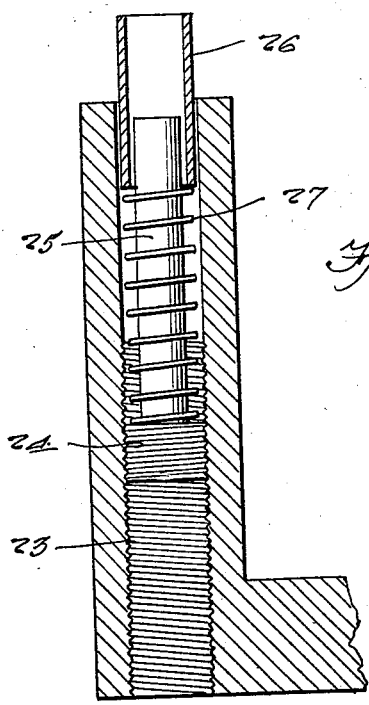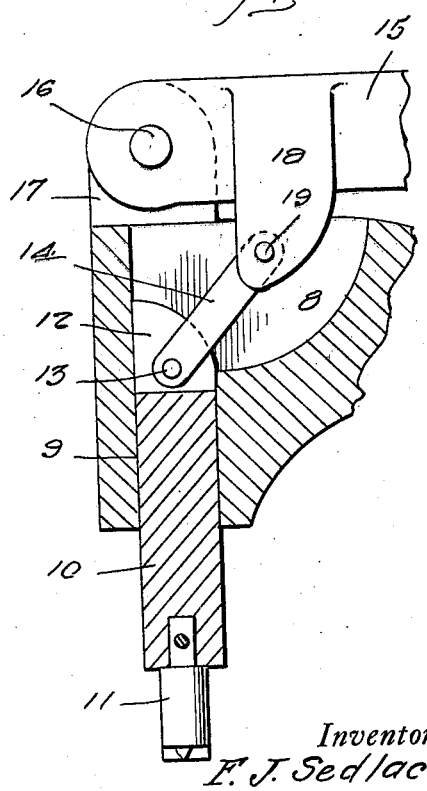

1,715,431

UNITED STATES PATENT OFFICE.

FRED J. SEDLACEK, OF LAMBERT, MONTANA.

TIRE-MENDING APPARATUS.

Application filed October 1, 1927. Serial No. 223,427.

This invention relates to an apparatus particularly designed for mending tires and more particularly for riveting blow-out patches in tire casings.

An important object of the invention resides in the provision of an apparatus of this nature which is easy to manipulate, simple in its construction, thoroughly efficient and reliable in operation, compact and convenient in its arrangement of parts and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is a side elevation of the apparatus embodying the features of my invention, Figure 2 is an end elevation thereof, Figure 3 is a top plan view thereof, Figure 4 is an enlarged vertical section taken substantially on the line 4—4 of Figure 2, Figure 5 is an enlarged detail section taken substantially on the line 5—5 of Figure 3, and, Figure 6 is a detail section taken substantially on the line 6—6 of Figure 1.

Referring to the drawings in detail it will be seen that the numerals 5 denote a base from one end of which rises a standard 6 having an arm 7 fixed to the upper end thereof and extending laterally therefrom. The end of the arm is provided with a recess 8 merging into a vertical bore 9 through which is slidable an anvil holder 10 on the bottom end of which is mounted an anvil 11. The upper end of the anvil holder 10 is slotted as at 12 and has pivoted therein as at 13 a link 14. A lever 15 is pivoted as at 16 on the arm by means of ears 17 and has a projection 18 which is pivotally engaged as at 19 with the link 14 so that by rocking the lever 15 the anvil holder 10 and its anvil 11 may be raised and lowered. A sleeve 20 is rotatable about the standard 6 and has an arm 21 projecting laterally from the lower end thereof. A container 22 rises from the arm 21 and is internally threaded at the lower portion as is indicated at 23 for threadedly receiving a head 24 on a rivet driver 25. A tubular rivet pocket 26 is disposed over the upper end of the driver 25 and is held in a raised position by means of a coil spring 27 disposed about the driver 25 and resting on the head 24. Another container 22' is similar to container 22 and has similar parts therein but on a smaller scale. This container 22' is supported by an arm 21' projecting laterally from the upper portion of the sleeve 20.

A projection 30 is extended laterally from the lower end of the sleeve and is provided with an aperture 31. A catch 32 is pivoted as at 33 on the base 25 and has a pin 34 for projection in the aperture 31 to hold the container 22 under the anvil 11. A spring 35 holds the catch 32 normally in an engaged position. Another projection 30' is projected laterally from the sleeve and is constructed similar to the projection 30 so that the sleeve may be rotated to place the container 22' under the anvil and held because of the engagement of the pin 34 therewith.

In using this device for fixing blow-out patches in tire shoes larger rivets are used at the tread portion of the tire by means of the container 22 and smaller rivets are used adjacent the bead of the tire by using the smaller container 22'.

It will thus be seen that the shoes may be mended in a quick and efficient manner by the use of rivets which will hold the patches securely in place. The structure is simple, yet thoroughly efficient and reliable in its operation.

It is thought that the construction, utility, operation and advantages of the invention will be now quite fully understood by those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. An apparatus of the class described comprising a base, a standard rising from the base, a sleeve rotatable on the standard and having a pair of laterally projecting arms disposed in angular relation to each other, containers on the arms, rivet drivers adjustably mounted in the containers, spring pressed pockets on the upper ends of the drivers, means for holding the sleeve in different fixed positions, and handle means operable to spread rivets on the drivers.

2. An apparatus of the class described comprising a base, a standard rising from the base, a sleeve rotatable on the standard and having a pair of laterally projecting arms disposed in angular relation to each other, containers on the arms, rivet drivers adjustably mounted in the containers, spring pressed pockets on the upper ends of the drivers, means for holding the sleeve in different fixed positions, handle means operable to spread rivets on the drivers, said first mentioned means comprising a pair of apertured projections from the sleeve, and a spring-pressed catch engageable therewith, said catch being mounted on the base.

3. In an apparatus of the class described comprising a base, a standard rising from the base, an arm on the upper end of the standard disposed laterally thereto and having its outer end provided with a recess and a bore leading downwardly therefrom, an anvil holder slidable in the bore, an anvil on the lower end of the holder, a link pivotally engaged with the holder, a lever pivotally engaged on the arm, said link being pivotally engaged with said lever, a sleeve rotatable on the standard having an arm projecting laterally therefrom, a container rising from the end of the last mentioned arm, a driver adjustably mounted in the container, a spring about the arm, and a pocket on the driver resting on the spring.

4. In an apparatus of the class described comprising a base, a standard rising from the base, an arm on the upper end of the standard disposed laterally thereto and having its outer end provided with a recess and a bore leading downwardly therefrom, an anvil holder slidable in the bore, an anvil on the lower end of the holder, a link pivotally engaged with the holder, a lever pivotally engaged on the arm, said link being pivotally engaged with said lever, a sleeve rotatable on the standard having an arm projecting laterally therefrom, a container rising from the end of the last mentioned arm, a driver adjustably mounted in the container, a spring about the arm, a pocket on the driver resting on the spring, and means for holding the sleeve in a position to dispose the driver under the anvil.

In testimony whereof I affix my signature.

FRED J. SEDLACEK.